United States Patent
Wibbeler

(10) Patent No.: US 9,001,059 B2
(45) Date of Patent: Apr. 7, 2015

(54) METHOD AND APPARATUS FOR CHOOSING AN INTENDED TARGET ELEMENT FROM AN IMPRECISE TOUCH ON A TOUCH SCREEN DISPLAY

(75) Inventor: Patrick Richard Wibbeler, Rocklin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 189 days.

(21) Appl. No.: 13/492,345

(22) Filed: Jun. 8, 2012

(65) Prior Publication Data

US 2013/0328788 A1 Dec. 12, 2013

(51) Int. Cl.
*G06F 3/0488* (2013.01)

(52) U.S. Cl.
CPC .................... *G06F 3/0488* (2013.01)

(58) Field of Classification Search
CPC .......... G06F 3/041; G06F 3/033; G06F 3/048
USPC ........................... 345/173; 715/702
See application file for complete search history.

(56) References Cited

U.S. PATENT DOCUMENTS

| | | | |
|---|---|---|---|
| 5,627,567 A * | 5/1997 | Davidson ...................... | 345/173 |
| 6,259,436 B1 * | 7/2001 | Moon et al. .................. | 345/173 |
| 8,013,839 B2 * | 9/2011 | Ording et al. ................ | 345/157 |
| 8,042,044 B2 | 10/2011 | Van Leeuwen | |
| 8,121,652 B2 | 2/2012 | Rider et al. | |
| 2006/0022955 A1 * | 2/2006 | Kennedy ........................ | 345/173 |
| 2006/0161846 A1 * | 7/2006 | Van Leeuwen ............... | 715/702 |
| 2007/0247442 A1 * | 10/2007 | Andre et al. .................. | 345/173 |
| 2009/0327886 A1 | 12/2009 | Whytock et al. | |
| 2010/0259493 A1 * | 10/2010 | Chang et al. ................. | 345/173 |

OTHER PUBLICATIONS

Christian Holz, Patrick Baudisch, "The generalized perceived input point model and how to double touch accuracy by extracting fingerprints", CHI2010: Proceedings of the 28th Annual Chi Conference on Human Factors in Computing Systems, vols. 1-4 : 581-590 2010, Apr. 10-15, 2010.

* cited by examiner

*Primary Examiner* — Dwayne Bost
*Assistant Examiner* — Chineyere Wills-Burns
(74) *Attorney, Agent, or Firm* — Keller Jolley Preece

(57) ABSTRACT

A method and apparatus for an improved workflow for choosing an intended target element from an imprecise touch on a touch screen display comprises determining whether a touch is within a bounding box of precisely one of a plurality of elements on a touch screen display; expanding the bounding box of all of the elements in the plurality of elements; determining whether the touch is within the expanded bounding box of at least one element in the plurality of elements; calculating a distance between the touch and a center of the bounding box for at least two elements in the plurality of elements, wherein the touch is determined to be within the expanded bounding box of the at least two elements; and determining a target element based on the shortest calculated distance between the touch and a center of the bounding box of the at least two elements.

20 Claims, 5 Drawing Sheets

METHOD AND APPARATUS FOR CHOOSING AN INTENDED TARGET ELEMENT FROM AN IMPRECISE TOUCH ON A TOUCH SCREEN DISPLAY

BACKGROUND OF THE INVENTION

1. Field of the Invention

Embodiments of the present invention generally relate to interactive touch screen displays, and more particularly, to a method and apparatus for choosing an intended target element from an imprecise touch on a touch screen display.

2. Description of the Related Art

Touch is a highly imprecise input mechanism on touch screen displays. Yet, touch is so visceral that correctly responding to a user's touch on a clickable area of touch screen display is essential to a good user experience. When responding to touch on a touch screen display, most touch applications use "hit testing" which requires a touch to be within a certain region around or within an interactive element to cause that element to be selected. This region is usually offset slightly lower than the target element to accommodate user tendency to touch slightly below the intended element. This approximate matching works well for interfaces designed explicitly for interactivity via touch. Such interactive elements can be appropriately sized and placed far enough apart from each other so that it is easy to discern which region was intended.

However, for interfaces that pre-date touch screen implementation, it is likely that existing interactive elements might be small, or placed closely together (particularly at low zoom levels). For these, a simple expanded hit region is not enough because there will be many overlapping regions on the page.

Therefore, there is a need for a method and apparatus for choosing an intended target element from an imprecise touch on a touch screen display.

SUMMARY OF THE INVENTION

The present invention provides a method and apparatus for choosing an intended target element from an imprecise touch on a touch screen display. In one embodiment, the method comprises determining whether a touch point is within a bounding box of precisely one of a plurality of elements on a touch screen display. If it is not, the method expands the bounding box of all elements in the plurality of elements and determines whether the touch point is within the expanded bounding box of any of the elements in the plurality of elements. The method then calculates a distance between the touch point and a center of the bounding box for at least two elements in the plurality of elements, wherein the touch point is determined to be within the expanded bounding box for the at least two elements. The target element is the element determined to have the shortest calculated distance between the touch point and a center of the bounding box of the at least two elements in the plurality of elements, wherein the touch point is determined to be within the expanded bounding box for the at least two elements.

Figure 1:
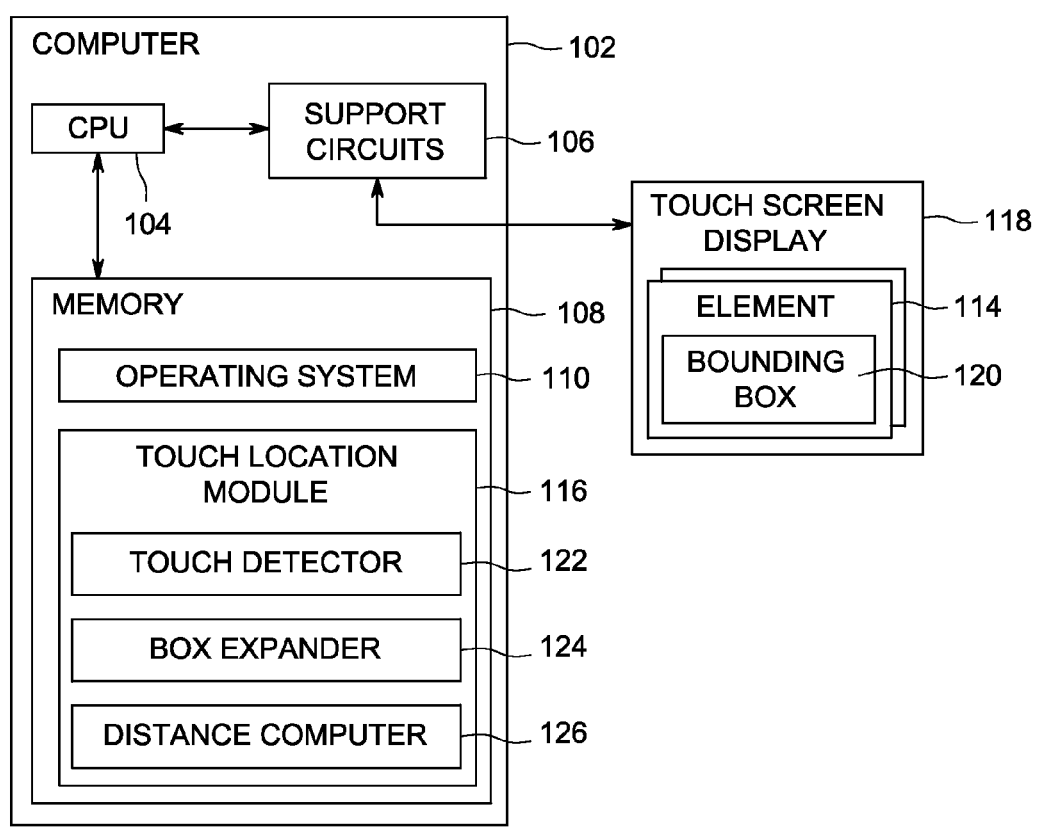
FIG. 1 depicts a block diagram of a system for choosing an intended target element from an imprecise touch on a touch screen display, according to one or more embodiments of the invention.

While the method and apparatus is described herein by way of example for several embodiments and illustrative drawings, those skilled in the art will recognize that the method and apparatus for choosing an intended target element from an imprecise touch on a touch screen display are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for choosing an intended target element from an imprecise touch on a touch screen display as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone. Even furthermore, the word "touch" as used herein is to be construed broadly so as to include other implementations of touch contact, such as contact having a time and/or force variable, resulting is what is commonly called a "tap", as well as a touch without actual physical contact, such as by capacitive sensing. These examples are merely illustrative of several variations, all of which are considered to be "touch".

DETAILED DESCRIPTION OF EMBODIMENTS

Embodiments of the present invention comprise a method and apparatus for choosing an intended target element from an imprecise touch on a touch screen display. In one embodiment, the interactive elements have a presentation size of ¼"×¼" or smaller, which typically are found on older interfaces not designed explicitly for user interactivity via a touch screen display. In other embodiments, the interactive elements are areas of the touch screen display capable of being clicked to initiate an action, such as a link, a scroll bar, a button, and the like. The embodiments utilize a touch screen computer that uses a touch location module to determine a chosen intended target element. When a touch is detected at a touch point on a touch screen display, the method determines whether the touch point is within the boundary of an interactive element on the touch screen. The boundary is a box defined by x and y coordinates as on a coordinate plane, hereafter referred to as a bounding box. If the touch point is within the bounding box of precisely one element, the method returns that element as a match. If, however, the touch point is not within the bounding of an element, the method increases the bounding box of every element on the touch screen by a predefined dimension on each side. This bounding box of increased size is hereafter referred to as an expanded bounding box. The method then determines whether the touch point is within any of the expanded bounding boxes of the interactive elements. If the touch point is still not within any of the bounds of any interactive elements even with the expanded boundaries, the method returns NULL meaning there is no match. However, if the method determines that the touch point is within the expanded bounding box of at least one element, the method calculates the distance from the touch point to the center of the element's bounding box for each element, wherein the touch point falls within the element's expanded bounding box. The element with a center point nearest the touch point is returned as a match.

Various embodiments of an apparatus and method for choosing an intended target element from an imprecise touch on a touch screen are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for choosing an intended target element from an imprecise touch on a touch screen display, according to one or more embodiments of the invention. The system 100 comprises computer 102 and a touch screen display 118. The system 100 determines the intended target from an imprecise touch on the touch screen display 118.

The computer 102 comprises a CPU 104, support circuits 106, and a memory 108. The computer 102 is a type of computing device capable of receiving input from a touch screen display (e.g., a laptop, a desktop, a Personal Digital Assistant (PDA) and/or the like). The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, displays, and the like. The memory 108 comprises at least one of Read Only Memory (ROM), Random Access Memory (RAM), disk drive storage, optical storage, removable storage and/or the like. The memory 108 comprises an operating system 110 and a touch location module 116. The touch location module 116 comprises a touch detector 122, a box expander 124, and a distance computer. The touch screen display 118 comprises elements 114. In one embodiment, the elements 114 may be form elements. Each element 114 comprises a bounding box 120, which is a boundary around the element 114 in the shape of a box defined by x and y coordinates, with the touch screen display 118 representing an x-y coordinate plane. According to some embodiments of the invention, the operating system (OS) 110 generally manages various computer resources (e.g., network resources, file processors, and/or the like). The operating system 110 is configured to execute operations on one or more hardware and/or software modules, such as Network Interface Cards (NICs), hard disks, virtualization layers, firewalls and/or the like. Examples of the operating system 110 may include, but are not limited to, Android, iOS, Linux, Mac OSX, BSD, Unix, Microsoft Windows, and the like.

The touch location module 116 processes input from the touch screen display 118 to determine which element 114 on the touch screen display 118 is the intended target element selected by a user. According to some embodiments, when a user touches the touch screen display 118 with the user's finger or stylus, the touch location module 116 determines the intended target element 114 based on whether the touch point falls within the bounding box 120 of the element 114. The touch detector 122 determines the x and y coordinates of the touch point on the touch screen display 118. The touch location module 116 determines whether there is a precise match between the touch point on the touch screen display 118 and an element 114 on the touch screen display 118. A precise match exists if the touch point on the touch screen display 118 falls within the bounding box 120 of an element 114. If the touch point does not fall within the bounding box 120 of any element 114, the box expander 124 expands the bounding box 120 of each element 114 on the touch screen display 118 by a predefined dimension on each side. The touch location module 116 then determines whether the touch point falls within the expanded bounding box of any elements 114. If the touch point falls within the expanded bounding box of just one element 114, that element 114 is determined to be the intended target element. However, if the touch point falls within the expanded bounding box of more than one element 114, the distance computer 126 calculates the distance from the touch point to the center point of the bounding box 120 of each element 114 within which the touch point falls. The element 114 with the shortest calculated distance from the touch point to the center of its bounding box 120 is deemed to be the intended target element. If the touch point does not fall within the expanded bounding box of any element 114, the touch location module 116 determines that no element 114 was targeted.

Figure 2:
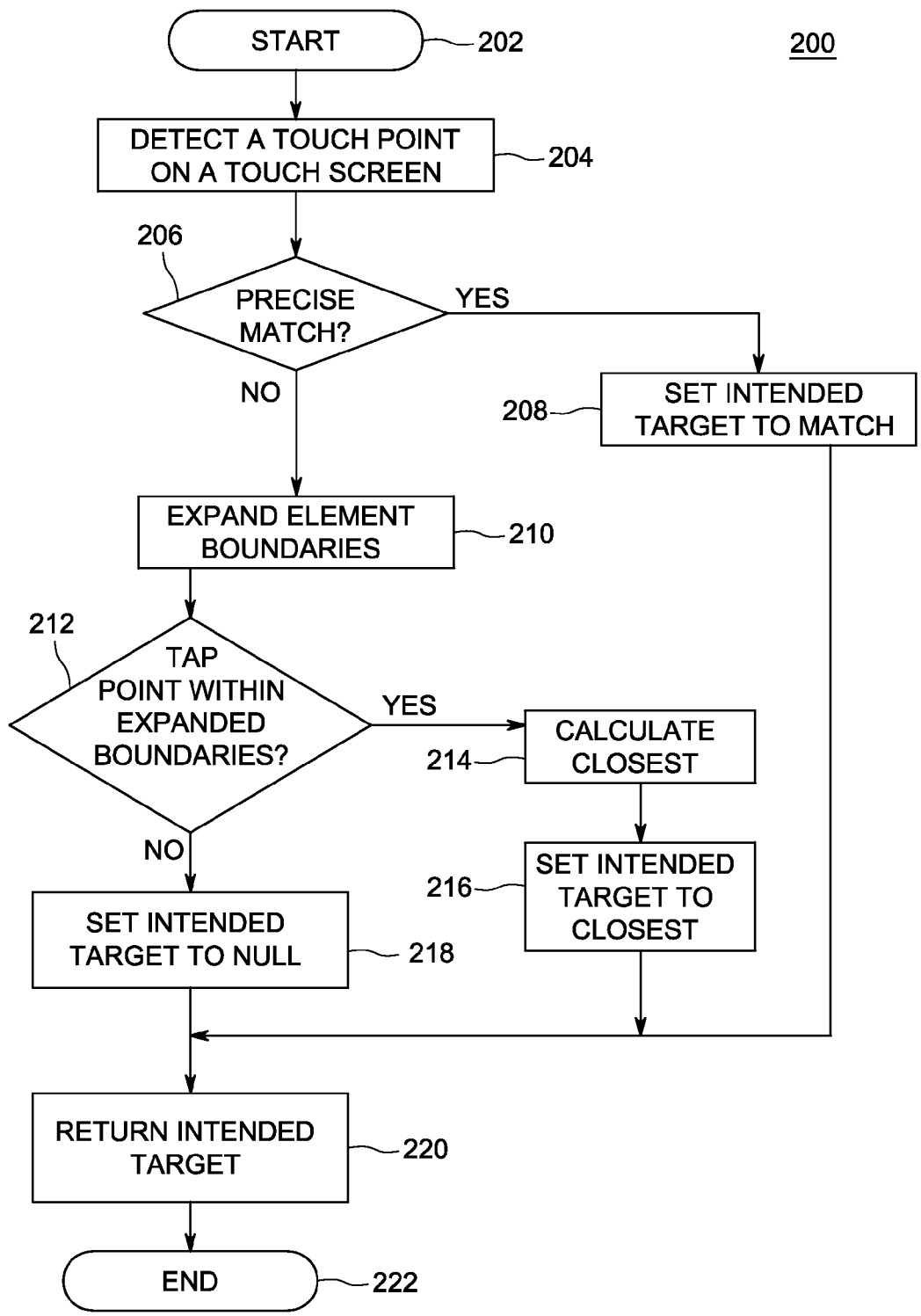
FIG. 2 depicts a flow diagram of a method for choosing an intended target element from an imprecise touch as performed by the touch location module of FIG. 1, according to one or more embodiments of the invention.

FIG. 2 depicts a flow diagram of a method 300 for choosing an intended target element from an imprecise touch as performed by the touch location module 116 of FIG. 1, according to one or more embodiments of the invention. The method 200 determines which element on the touch screen is likely to be the intended target of a user. If a precise match does not exist, the method 200 expands the search by a predefined dimension to determine whether an interactive element is close to the touch point. The method 200 starts at step 202, and proceeds to step 204.

At step 204, the method 200 detects a touch point on a touch screen display 118. The touch point may be from a finger, a stylus, or other input device capable of being recognized by the touch screen. The touch screen is a coordinate plane with an x and y axis. The x and y coordinates of the touch point are determined and stored for comparison with the elements on the touch screen. The method 200 proceeds to step 206.

At step 206, the method 200 determines whether there is a precise match to a specific interactive element on the touch screen display 118. Each element on the touch screen comprises a bounding box. The bounding box is defined by x and y coordinates for each of the four corners. If the x and y coordinates of the touch point are within the bounds of a bounding box of an element, the element is determined to be the intended target element. The x and y coordinates of the touch point are within the bounds of a bounding box of an element if the touch point x value is less than or equal to the maximum x value of the bounding box of the element and greater than or equal to the minimum x value of the bounding box AND the touch point y value is greater than or equal to the minimum y value of the bounding box and less than or equal to the maximum y value of the bounding box. If a precise match exists, the method 200 proceeds to step 208. At step 208, the method 200 sets the intended target to the element found to be the precise match. The method proceeds to step 220.

If at step 206, a precise match is not found, meaning the touch point did not fall within the bounding box of an element on the touch screen display 118, the method 200 proceeds to step 210.

At step 210, the method 300 expands the bounding boxes of all of the elements on the touch screen display 118. Each bounding box is expanded by a predefined dimension on each side, for example, ¼ inch in physical screen dimensions. The method 200 proceeds to step 212.

At step 212, the method 200 determines whether the touch point falls within the expanded bounding boxes of any of the elements on the touch screen display 118. For each element, the method 200 calculates whether the x and y coordinates of the touch point are within the bounds of the expanded bounding box of an element by determining if the touch point x value is less than or equal to the maximum x value of the expanded bounding box of the element and greater than or equal to the minimum x value of the expanded bounding box AND the touch point y value is greater than or equal to the minimum y value of the expanded bounding box and less than or equal to the maximum y value of the expanded bounding box. When a touch point is found to be within the expanded bounding box of an element, the element is stored in a list for later processing. If the touch point is not determined to be within the expanded bounding box of any elements on the touch screen, the method 200 proceeds to step 218.

At step 218, the method 200 sets the intended target to NULL, meaning no element was found. The method 200 proceeds to step 220. If at step 216, the method 200 determines that the touch point falls within the expanded boundaries of one or more interactive elements on the touch screen, the method proceeds to step 214. At step 214, the method 200 calculates which of the elements stored in the list for processing is closest to the touch point as described further in method 300 of FIG. 3 below. Method 300 returns the element which is determined to be closest to the touch point. The method 200 proceeds to step 216. At step 216, the method 200 sets the intended target to the closest element returned by method 300. The method 200 proceeds to step 220.

At step 220, the method 200 returns the intended target. The method 200 proceeds to step 222 and ends.

Figure 3:
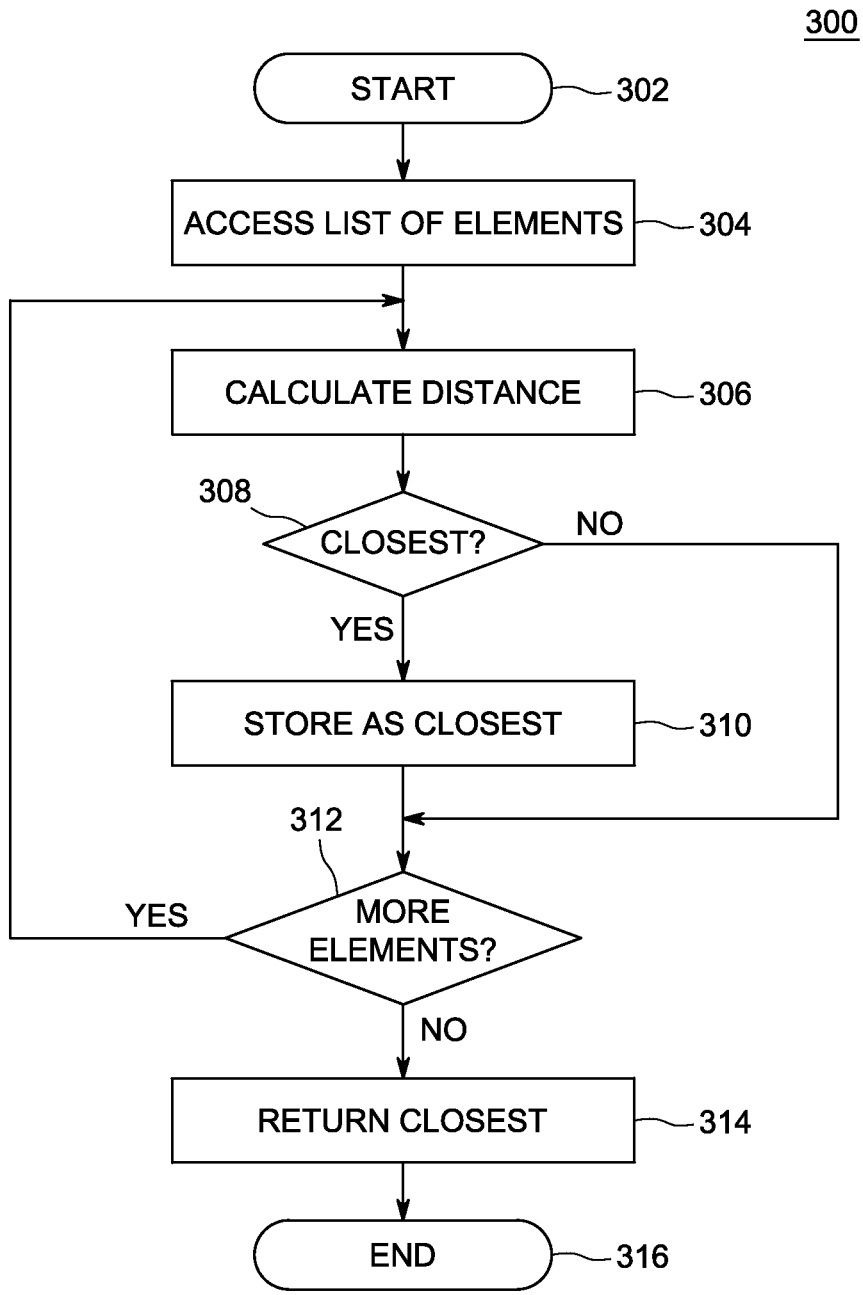
FIG. 3 depicts a flow diagram of a method for calculating a closest element to a touch point on a touch screen display from FIG. 2, according to one or more embodiments of the invention.

FIG. 3 depicts a flow diagram of a method 300 for calculating a nearest element to a touch point on a touch screen display from FIG. 2, according to one or more embodiments of the invention. The method 300 accesses the stored list of elements whose expanded bounding boxes were determined to contain the touch point. For each element in the list, the method 300 calculates the distance from the touch point to the center of the bounding box of each element and returns the closest element.

The method 300 starts at step 302, and proceeds to step 304. At step 304, the method 300 accesses the list of elements whose expanded bounding boxes were determined to contain the touch point. The method 300 proceeds to step 306. At step 306, the method 300 calculates the distance from the touch point to the center of the bounding box of the element. The distance is calculated using the distance formula commonly known in analytical geometry for determining the distance between two points in an xy plane:

$$d = \sqrt{(x_2 - x_1)^2 + (y_2 - y_1)^2}$$

where d is the distance between the touch point and the center of the bounding box of the element, $x_1$ is the x coordinate for the touch point, $x_2$ is the x coordinate for the center of the bounding box of the element, $y_1$ is the y coordinate for the touch point, and $y_2$ is the y coordinate for the center of the bounding box of the element.

The method 300 proceeds to step 308. At step 308, the method 300 compares the distance d to a currently stored distance of the closest element. If this is the first element to have the distance calculated, the element will be stored as the closest element along with its calculated distance from the touch point. For each element thereafter, if the distance d is less than the currently stored distance value for the current closest element, the method 300 proceeds to step 310. At step 310, the method 300 replaces the current closest element with the new closer element and the element's distance d. The method 300 proceeds to step 312. If the distance d is not less than the currently stored distance value for the current closest element, the method 300 proceeds to step 312.

At step 312, the method 300 determines whether there are more elements on the stored list of elements whose expanded bounding boxes were determined to contain the touch point. Each of the elements must have the distance calculated from the touch point to the center of its bounding box so the closest element may be determined. If the method 400 determines there are more elements on the stored list, the method 300 proceeds to step 306 and iterates until a distance has been calculated for each element on the stored list. When the method 300 completes iterating through the list of elements on the stored list, the element with the shortest distance between the touch point and the center of its bounding box will be stored as the closest element. If at step 312, the method 300 determines there are no more elements on the stored list, the method 300 proceeds to step 314. At step 314, the method 300 returns the closest element. The method 300 proceeds to step 316 and ends.

FIGS. 4A, 4B, 4C, and 4D depict a schematic illustrating choosing an intended target element from an imprecise touch on a touch screen display as performed using the system of FIG. 1, according to one or more embodiments of the invention.

Figure 4A:
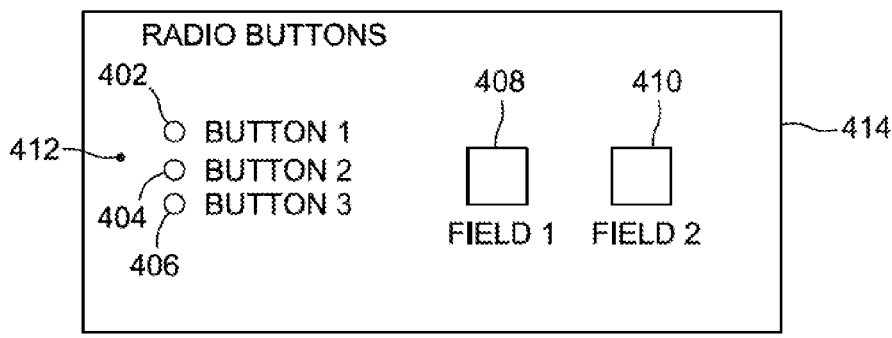
FIGS. 4A, 4B, 4C, and 4D depict a schematic illustrating choosing an intended target element from an imprecise touch on a touch screen display as performed using the system of FIG. 1, according to one or more embodiments of the invention.

FIG. 4A contains five interactive elements 402, 404, 406, 408, and 410 on a touch screen display 414. A touch point 412 is displayed where a user touched the touch screen display 414 with a finger, stylus, or other input device.

Figure 4B:
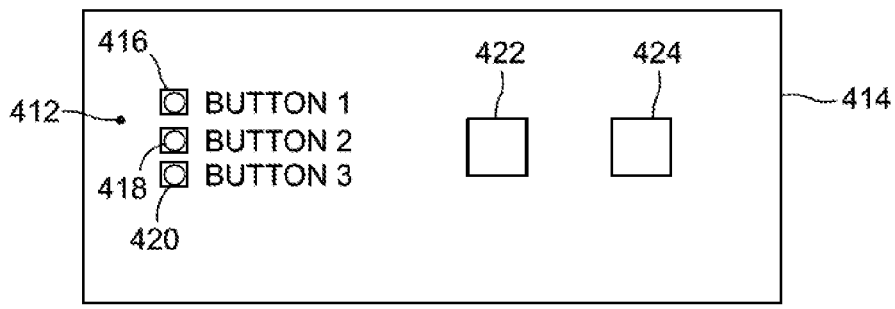

FIG. 4B illustrates the bounding boxes 416, 418, 420, 422, and 424 which define the boundaries surrounding each interactive element 402, 404, 406, 408, and 410. As shown, the touch point 412 lies outside of the bounding boxes 416, 418, 420, 422, and 424 of the all of the interactive elements 402, 404, 406, 408, and 410 on the touch screen display 414.

Figure 4C:
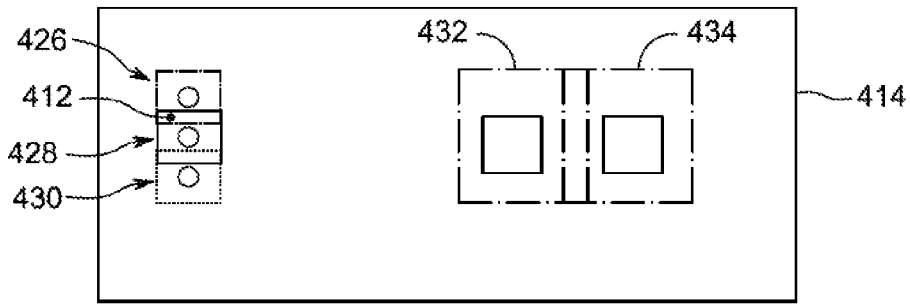

FIG. 4C illustrates expanding the bounding boxes of all of the interactive elements 402, 404, 406, 408, and 410 on the touch screen display 414. The system determines whether the touch point 412 is within any of the expanded bounding boxes 426, 428, 430, 432, and 434. In this example, the touch point 412 lies within the expanded bounding boxes 426 and 428.

Figure 4D:
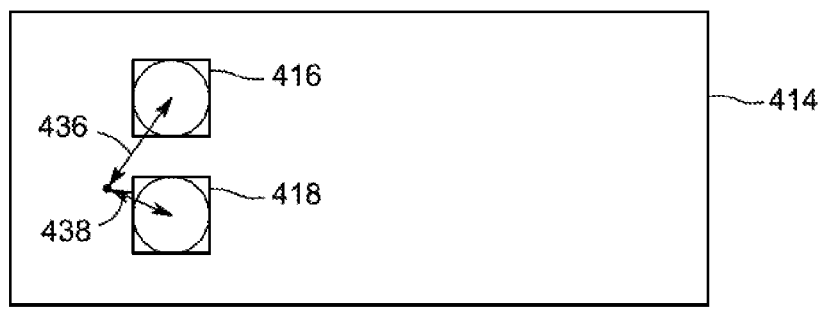

FIG. 4D illustrates calculating the distance 436, 438 from the touch point 412 to the center of the bounding box for each interactive element, wherein the touch point 412 was determined to be inside the expanded bounding box of the element, in this example, interactive elements 402 and 404. The shortest distance is found to be from the touch point 412 to the center of element 404. Hence, the target element is deemed to be element 404.

In some embodiments, the elements are form elements, such as input fields, radio buttons, check boxes, and the like. For forms that pre-date touch screen implementation, it is likely that existing interactive elements might be small, or placed closely together (particularly at low zoom levels). For these, a simple expanded hit region is not enough because there will be many overlapping regions on the page. Many of these form elements have a presentation size of ¼"×¼" or smaller, which typically are found on older interfaces not designed explicitly for user interactivity via a touch screen display. Embodiments of the invention provide an effective means for determining a target element from among these small or closely placed form elements.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
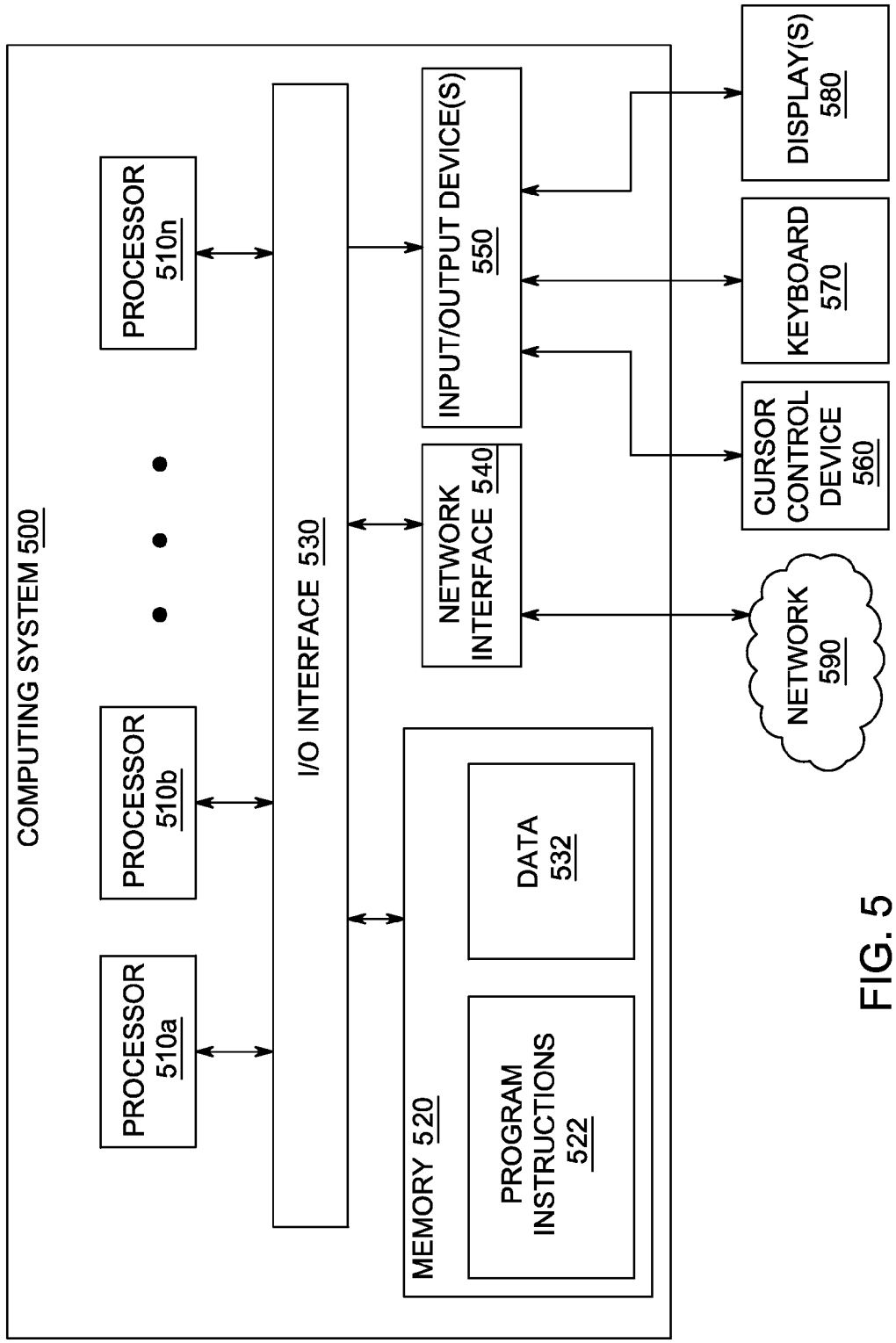
FIG. 5 depicts a computer system that can be utilized in various embodiments of the present invention, according to one or more embodiments of the invention.

FIG. 5 depicts a computer system that can be used to implement the methods of FIGS. 2-3 in various embodiments of the present invention, according to one or more embodiments of the invention. FIG. 5 depicts a computer system that can be utilized in various embodiments of the present invention to implement the computer 102, according to one or more embodiments.

Various embodiments of method and apparatus for choosing an intended target element from an imprecise touch on a touch screen, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200 and 300, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more touch screens, display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIGS. 3-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for choosing an intended target element from an imprecise touch on a touch screen display, comprising:
    defining, a respective bounding box for each of a plurality of elements displayed on the touch screen display, a respective bounding box surrounding a corresponding one of the plurality of elements but not forming part of the corresponding element;
    determining that a touch point is not within any of the bounding boxes of the plurality of elements on a touch screen display;
    expanding the bounding boxes of the elements in the plurality of elements based on the determination that the touch point is not within any of the bounding boxes of the plurality of elements, wherein expanding the bounding boxes of the elements comprises causing expanded bounding boxes to overlap;
    determining that the touch point is within two overlapping expanded bounding boxes of two elements in the plurality of elements;
    calculating a distance between the touch point and a center of each of the two overlapping expanded bounding boxes of the two elements in the plurality of elements; and
    choosing a target element from the two elements based on which expanded bounding box of the two overlapping expanded bounding boxes that has the shortest calculated distance between the touch point and the center of the expanded bounding box.

2. The method of claim 1, wherein each of the plurality of elements on the touch screen display has a dimension equal or less than 6.35 mm by 6.35 mm (¼ inch by ¼ inch).

3. The method of claim 1, wherein the touch point comprises x and y coordinates defining a location on the touch screen display.

4. The method of claim 1, wherein each bounding box is defined by four x,y coordinate pairs representing four corners of the bounding box.

5. The method of claim 1, wherein expanding the bounding box comprises increasing each bounding box by a predefined dimension on each side to obtain uniformly expanded bounding boxes.

6. The method of claim 1, wherein determining that the touch point is within the two overlapping expanded bounding boxes comprises determining that an x value for the touch point is less than or equal to maximum x values of each of the two overlapping expanded bounding boxes and greater than or equal to minimum x values of each the two overlapping expanded bounding boxes and a y value of the touch point is greater than or equal to minimum y values of the two overlapping expanded bounding boxes and less than or equal to maximum y values of the two overlapping expanded bounding boxes.

7. The method of claim 1, further comprising:
    identifying a second touch point;
    determining that the second touch point does not lie within any of the expanded bounding boxes; and
    returning a null value for the second touch point based on the determination that the second touch point does not lie within any of the expanded bounding boxes.

8. An apparatus for choosing the intended target element from an imprecise touch on a touch screen display, comprising:
    a touch screen;
    at least one processor; and
    a non-transitory computer readable storage medium storing instructions, that when executed by the at least one processor, cause the apparatus to perform a method comprising:
    determining a location of a touch on the touch screen;
    determining that the touch is not within any bounding boxes of a plurality of elements displayed on the touch screen, wherein a bounding box is defined for each of the plurality of elements displayed on the touch screen and each bounding box surrounds a corresponding one of the plurality of elements but does not form part of the corresponding element;
    expanding the bounding boxes of the elements in the plurality of elements based on the determination that the touch is not within any of the bounding boxes of the plurality of elements, wherein expanding the bounding boxes of the elements comprises causing expanded bounding boxes to overlap; and
    determining that the touch is within two overlapping expanded bounding boxes of two elements in the plurality of elements;

calculating a distance between the touch and a center of each of the two overlapping expanded bounding boxes of the two elements in the plurality of elements; and determining a target element from the two elements based on which expanded bounding box of the two overlapping expanded bounding boxes has the shortest calculated distance between the touch and the center of the expanded bounding box of the two elements in the plurality of elements.

9. The apparatus of claim 8, wherein each of the plurality of elements on the touch screen is equal or less than 6.35 mm b 6.35 mm (¼ inch by ¼ inch).

10. The apparatus of claim 8, wherein the touch comprises x and y coordinates defining a location on the touch screen.

11. The apparatus of claim 8, wherein each bounding box is defined by four x,y coordinate pairs representing the four corners of the bounding box.

12. The apparatus of claim 8, wherein the instructions, when executed by the at least one processor, cause the apparatus to expand the bounding boxes by increasing each bounding box by a predefined dimension on each side.

13. The apparatus of claim 8, wherein the instructions, when executed by the at least one processor, cause the apparatus to determine that the touch is within the two overlapping expanded bounding boxes by determining that an x value of the touch is less than or equal to maximum x values of each of the two overlapping expanded bounding boxes and greater than or equal to minimum x values of each of the two overlapping expanded bounding boxes and a y value of the touch is greater than or equal to minimum y values of the two overlapping expanded bounding boxes and less than or equal to maximum y values of the two overlapping expanded bounding boxes.

14. A non transitory computer readable medium for storing computer instructions that, when executed by at least one processor cause the at least one processor to perform a method for choosing an intended target element from an imprecise touch comprising:

defining a respective bounding box for each of a plurality of elements displayed on a touch screen display, each respective bounding box surrounding a corresponding one of the plurality of elements but not forming part of the corresponding element;

determining that a touch point is not within any of the bounding boxes of the plurality of elements on the touch screen display;

expanding the bounding boxes of the elements in the plurality of elements to obtain a plurality of uniformly expanded bounding boxes based on the determination that the touch point is not within any of the bounding boxes of the plurality of elements, wherein expanding the bounding boxes of the elements comprises causing expanded bounding boxes to overlap;

determining that the touch point is within two overlapping expanded bounding boxes of two elements in the plurality of elements;

calculating a distance between the touch point and a center of each of the two overlapping expanded bounding boxes of the two elements in the plurality of elements; and choosing a target element from the two elements based on which expanded bounding box of the two overlapping expanded bounding boxes has the shortest calculated distance between the touch point and the center of the expanded bounding box.

15. The computer readable medium of claim 14, wherein each element on the touch screen display has a dimension equal or less than 6.35 mm by 6.35 mm (¼ inch by ¼ inch).

16. The computer readable medium of claim 14, wherein the touch point comprises x and y coordinates defining a location on the touch screen display.

17. The computer readable medium of claim 14, wherein each bounding box is defined by four x,y coordinate pairs representing four corners of the bounding box.

18. The computer readable medium of claim 14, wherein the instructions, when executed by at least one processor, cause the at least one processor to expand the bounding boxes by increasing each bounding box by a predefined dimension on each side to obtain uniformly expanded bounding boxes.

19. The computer readable medium of claim 14, wherein the instructions, when executed by at least one processor, cause the at least one processor to determine that the touch point is within the two overlapping expanded bounding boxes by determining that an x value of the touch point is less than or equal to maximum x values of each of the two overlapping expanded bounding boxes and greater than or equal to minimum x values of each of the two overlapping expanded bounding boxes and a y value of the touch point is greater than or equal to the minimum y values of the two overlapping expanded bounding boxes and less than or equal to the maximum y values of the two overlapping expanded bounding boxes.

20. The computer readable medium of claim 14, further comprising instructions, that when executed by at least one processor, cause the at least one processor to further perform a method comprising:

identifying a second touch point;

determining that the second touch point does not lie within any of the expanded bounding boxes; and returning a null value for the second touch point based on the determination that the second touch point does not lie within any of the expanded bounding boxes.

* * * * *